E. D. VAN DERSAL.
MOTOR DRIVEN CIGAR CUTTER AND INHALER.
APPLICATION FILED JAN. 23, 1915.
1,168,445.
Patented Jan. 18, 1916.
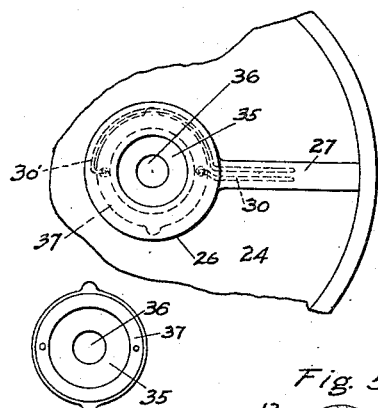
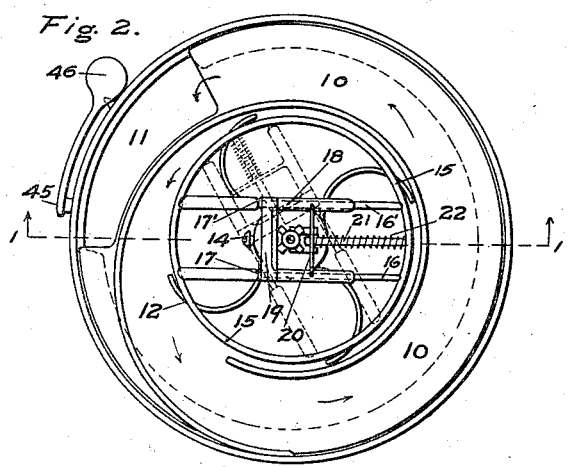
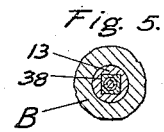
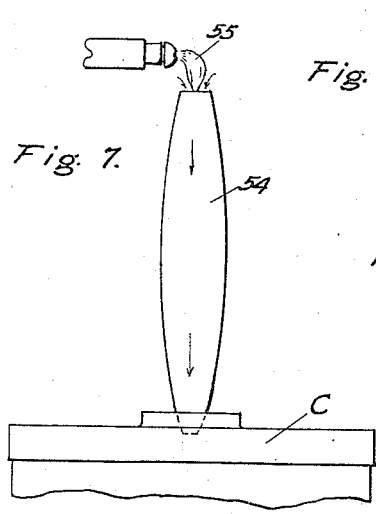
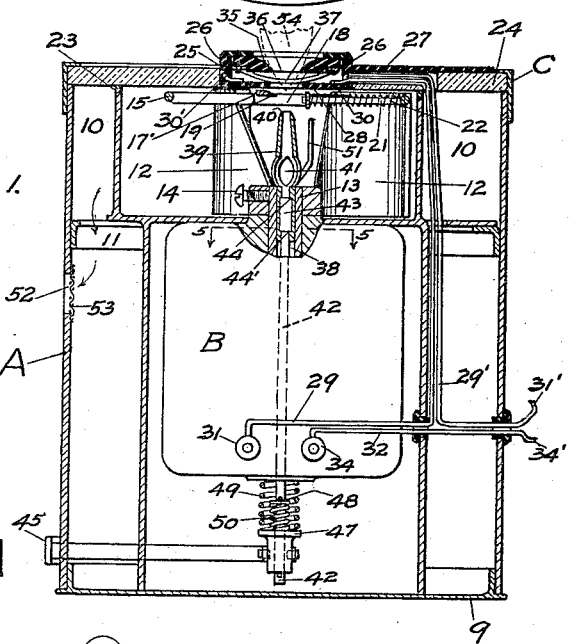
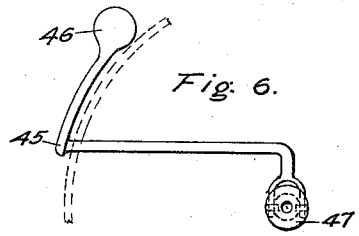
Ernest D. Van Dersal, Inventor,
By R. C. Wright, Atty.
Witnesses:

UNITED STATES PATENT OFFICE.

ERNEST D. VAN DERSAL, OF PORTLAND, OREGON.

MOTOR-DRIVEN CIGAR CUTTER AND INHALER.

1,168,445.   Specification of Letters Patent.   Patented Jan. 18, 1916.

Application filed January 23, 1915. Serial No. 3,968.

*To all whom it may concern:*

Be it known that I, ERNEST D. VAN DERSAL, a citizen of the United States, residing at Portland, in the county of Multnomah and State of Oregon, have invented a new and useful Improvement in Motor-Driven Cigar Cutters and Inhalers, of which the following is a specification, reference being had to the acompanying drawings.

My invention relates to that class of devices used for cutting tips from cigars or perforating them and also for removing dust and extraneous matter from the end of the cigar after it is cut or perforated.

The object of my invention is to provide a motor driven device for cutting the tips from cigars or perforating them, for the purpose of smoking, also for drawing out the free dust or extraneous matter after the cutting or perforating, by inhalation means, also to permit of the cigar being lighted by use of the device. I attain these objects, as well as other advantages, by the construction, combination and arrangement of parts illustrated in the accompanying drawings which form a part hereof.

Figure 1 is a sectional elevation of the device through its center on the line 1—1 in Fig. 2. Fig. 2 is a top plan view, the cover being removed. Fig. 3 is a fragmentary plan view of the cover showing electric button therein. Fig. 4 is a bottom plan view of the button showing spring on bottom. Fig. 5 is a fragmentary horizontal section on the line 5—5 of Fig. 1. Fig. 6 is a plan view of the lever which raises the perforator. Fig. 7 is an elevation of a fragmentary part of the top of the device showing a cigar in position, and a flame applied thereto.

Like numerals and letters apply to like parts in all views.

A is a cylindrical case.

B is an electric motor secured therein.

C is a cover for the case. The case is also provided with a removable bottom 9. In the upper part of the case is a spiral formed chamber 10 having an outlet 11 in its bottom near the case wall and at the end of the spiral. Within the spiral and the central part of the chamber 10 is a horizontally movable bladed fan 12 rigidly secured upon a vertical and rotatable motor armature shaft 13 by a set screw 14. The fan blades have an integral ring 15 on their upper edges. Secured to the ring are parallel horizontal guides 16—16' having stop shoulders 17—17' on one part thereof. A slidable frame 18 is placed upon the guides. The frame has a knife 19 transversely secured thereon. The frame also has a transverse bar 20. A pin 21 is rigidly secured at one end to the ring 15 and extends longitudinally between the guides 16—16'. A coil spring 22, of suitable tension, is placed on said pin, its ends engaging the bar 20 and the ring 15 respectively. On the upper edges of the spiral is a resilient substance 23 which engages the glass top 24.

The cover C has a glass top 24 with an opening 25 in its center. In the opening 25 a collar 26 of insulating material is placed, with a strip 27 of similar material extending from it a short distance. The collar 26 has an interior circular shoulder 28 on its lower part. Electric wires 29—29' extend from their contact ends 30—30' within the collar 26 through it and the strip 27 downward in the case to the connection 31 of the motor and at 31' leading outward to the electric power source respectively. The opposite power connecting wire 32 is shown connected at the motor connection 34 and leading outwardly at 34' to the power source. A button 35 of insulating material is provided, of a form adapted to be inserted in the collar 26. The button 35 is of concave form within and has a central circular opening 36. A circular strap spring contact 37 is secured on the bottom of the button. The spring is bent in a form to prevent connection with the wire ends 30—30' unless the button is pressed downwardly.

The motor shaft 13 has a vertical rectangular opening 38 near its upper end. A perforator 39 of conical shape in its upper end has a rectangular shank in its lower end adapting it to slide within the space 38. The perforator has its integral circular knife 40 in the upper end, is hollow within and has outlets 41 near its center.

The rectangular shank of the perforator has a circular opening through it. A vertical rod 42 extends from within the perforator shank through the motor into the lower part of the case A. The rod 42 has a circular head 43 on its upper end and the perforator shank has shoulders 44—44' to engage the upper and lower ends of the head 43 respectively. An operating lever 45 extends horizontally from without the case A to a position below the lower end of the rod 42 to which it is pivotally secured. A finger handle 46 is formed in the free end of the lever. The rod 42 has a collar 47 secured near its lower end and a smaller collar 48 secured a suitable distance above. A coil spring 49 is placed on the rod, its upper end engaging the bottom of the motor case, its lower end the collar 47. Within the spring 49 is a smaller coil spring 50 placed on the rod, its upper end engaging the collar 48, its lower end the collar 47. A catch 51 is secured at its lower end to the upper end of the shank of the perforator 39 and extends upwardly a sufficient distance to engage the bar 20 of the frame 18 when the perforator is elevated. The case A is provided with an air outlet 52 covered with a screen 53. A cigar 54 is shown in position for cutting in Figs. 1 and 7. A flame 55 is also shown in Fig. 7 applied to the cigar.

We will now assume that my device has been properly assembled as described and shown in the illustrations and connection has been made for the motor with a power source at 31' and 34' of the current wires. A pointed cigar is inserted at the tip end within the opening 36 of the button and the button is pressed downwardly. This effects the electric connection of the motor current wires through the spring 37 and causes the motor shaft to rotate and this to rotate the fan 12. The cover C makes the spiral chamber air tight, and the air being forced out in the direction of the arrows, Fig. 2, through the openings 11 and 52, this closes the opening 36 by drawing the cigar inwardly. At the same time the frame 18 is caused to slide outwardly by the centrifugal motion imparted to it by the rotary motion of guides 16—16'. This motion draws the knife 19 gradually around and to the center of the cigar until it has cut through it in a spiral manner. The spring 22 also receives a centrifugal motion at the same time which nullifies its pressure against the bar 20 and permits the knife to move as described. The position of the frame, knife and spring, after the cut is made is illustrated by the dotted line part in Fig. 2. It will further be seen that when the tip has been cut off, the suction from the fan draws air through the cigar because the button orifice is closed and this removes the tip, dust and extraneous matter, the same being discharged into the case A, the air passing through the outlet 52. The cigar refuse is taken out by removing the bottom 9. It will also be seen that upon pressing the lever 45, before the motor is started, the perforator 39 is raised to a position where it can engage and perforate the cigar and the catch 51 prevents the frame 18 from sliding. A blunt or round tipped cigar is then inserted as before. Upon engaging the perforator it is depressed as far as the spring 50 permits and this spring also allows the perforator to be raised again so it will cut gently and gradually into the cigar without breaking or tearing it. The refuse is drawn downwardly as before but through and around the perforator and thence discharged. The spring 49 causes the perforator to drop when the lever is released. It will likewise be seen that by leaving the cigar in position, after the tip is cut, so the motor continues to operate, the inhalation through the cigar permits of easily and quickly lighting it as shown.

I contend that my device accomplishes all the objects specified, as well as other advantages, is extremely simple of operation and very sanitary.

Having thus described my invention, I claim:

1. A cigar cutting and cleaning device, comprising a case having a spiral air chamber with an inlet and an outlet, a rotatable fan within the chamber, a support on its upper part, guides with stops thereon, secured upon the said support, a slidable frame on said guides provided with a knife and engageable with the guide stops, a spring positioned to engage the frame and the guide support, electrical motive means within the case, mechanism between said fan and the motive means to transmit rotary motion to the fan, means in the upper part of the case to effect an electrical connection between the motive means and a power source, substantially as described.

2. A cigar cutting and cleaning device, comprising a case having a spiral air chamber with an inlet and an outlet, a rotatable fan within the chamber, a perforator within the said chamber extending through the center of said fan and rotatable by it, means to vertically raise and drop said perforator, an auxiliary actuating spring on the perforator, electrical motive means within the case, mechanism between said fan and the motive means to transmit rotary motion to the fan, means in the upper part of the case to effect an electrical connection between the motive means and a power source, substantially as described.

3. A cigar cutting and cleaning device, comprising a case having a spiral air chamber with an inlet and an outlet, a rotatable fan within the chamber, guides with stops thereon, secured upon the upper part of the fan, a slidable frame on said guides provided with a knife and engageable with the guide stops, a spring positioned to engage the frame and the guide support, a perforator within said chamber extending through the center of said fan and rotatable by it, means to vertically raise and drop said perforator, an auxiliary actuating spring on the perforator, electrical motive means within the case, mechanism between said fan and the motive means to transmit rotary motion to the fan, means in the upper part of the case to effect an electrical connection between the motive means and a power source, substantially as described.

ERNEST D. VAN DERSAL.

Witnesses:
CYRUS CARUZZI,
J. B. HANLAND.

Copies of this patent may be obtained for five cents each, by addressing the "Commissioner of Patents, Washington, D. C."